July 3, 1923.

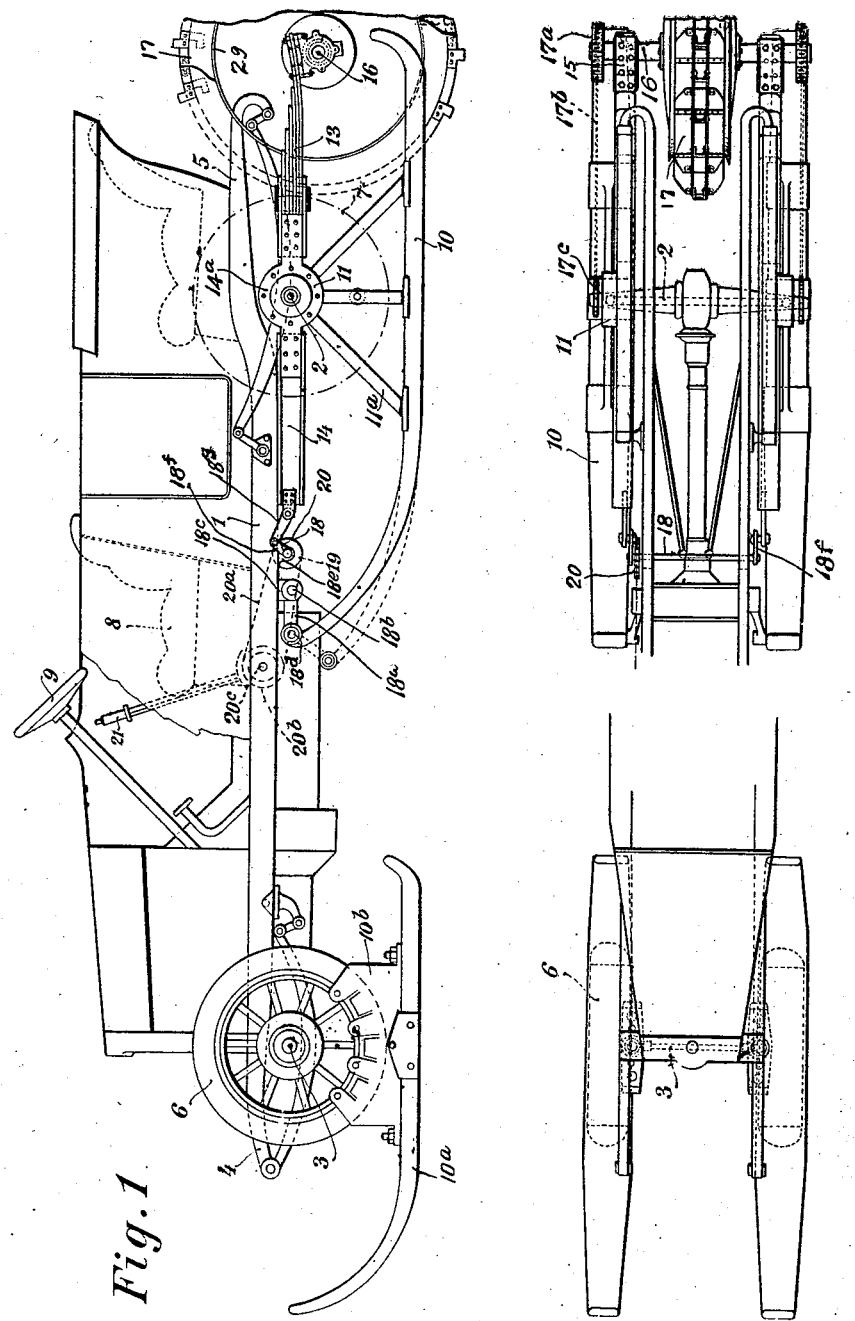

J. RANTASÁ

1,460,605

AUTOMOBILE SLEIGH ATTACHMENT

Filed April 3, 1920  3 Sheets-Sheet 2

July 3, 1923.
J. RANTASÁ
1,460,605
AUTOMOBILE SLEIGH ATTACHMENT
Filed April 3, 1920    3 Sheets-Sheet 3
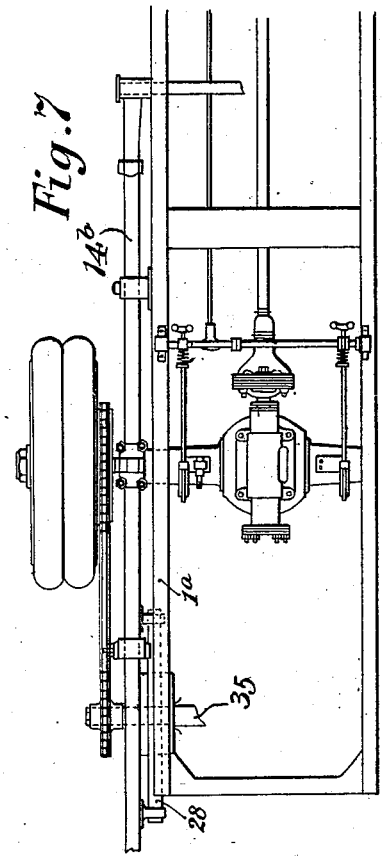
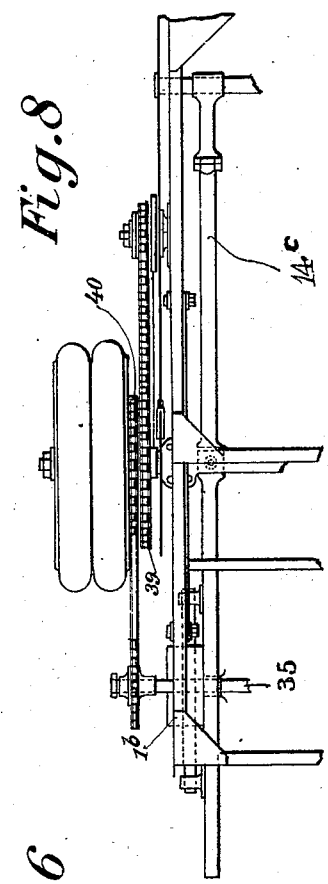
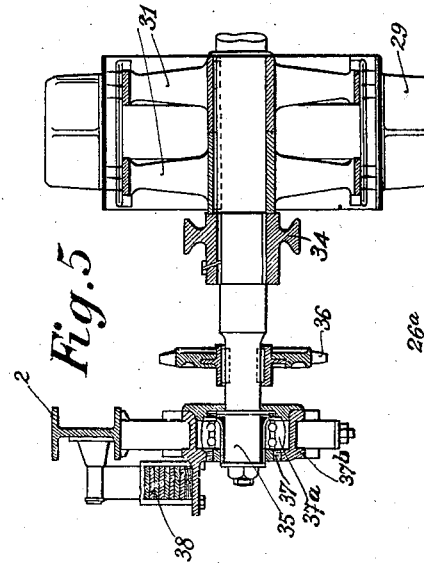
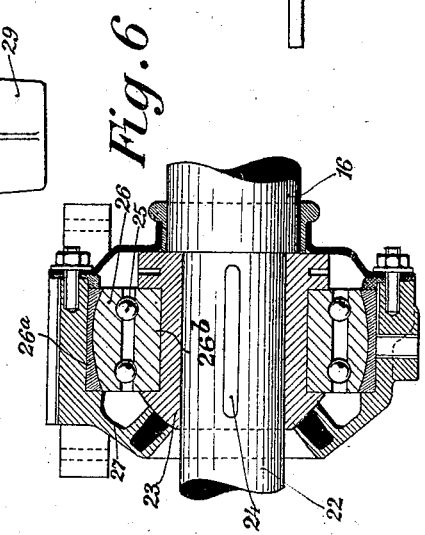
Inventor
Jakob Rantasá,
By B. Singer, Atty Patented July 3, 1923.

1,460,605

UNITED STATES PATENT OFFICE.

JAKOB RANTASÁ, OF VIENNA, AUSTRIA.

AUTOMOBILE SLEIGH ATTACHMENT.

Application filed April 3, 1920. Serial No. 371,135.

(GRANTED UNDER THE PROVISIONS OF THE ACT OF MARCH 3, 1921, 41 STAT. L., 1313.)

*To all whom it may concern:*

Be it known that I, JAKOB RANTASÁ, citizen of Austria, residing at Vienna, I., Wiplingerstrasse No. 13, Austria, have invented certain new and useful Improvements in Automobile Sleigh Attachments (for which I have filed applications for patent in Austria, January 23, 1915; Germany, June 30, 1917; Sweden, August 3, 1917; Norway, August 13, 1917; Switzerland, March 20, 1918; and Hungary, April 11, 1918), of which the following is a specification.

This invention relates to improvements in sled attachments for automobiles, the object being to provide improved devices of this kind which may be readily applied to an ordinary automobile, without the necessity of essentially changing the automobile.

The invention consists in the construction, combination and arrangement of devices hereinafter described and claimed.

In the accompanying drawings:—

Fig. 1 is an elevation of an automobile provided with sled attachments constructed and arranged in accordance with one embodiment of my invention.

Fig. 2 is a plan of the same.

Fig. 5 is a detail sectional view of the same.

Fig. 6 is a detail sectional view of one of the bearings, on a larger scale.

Fig. 7 is a plan of another modified form of my invention.

Fig. 8 is a similar view of another modified form of my invention.

Figure 3:
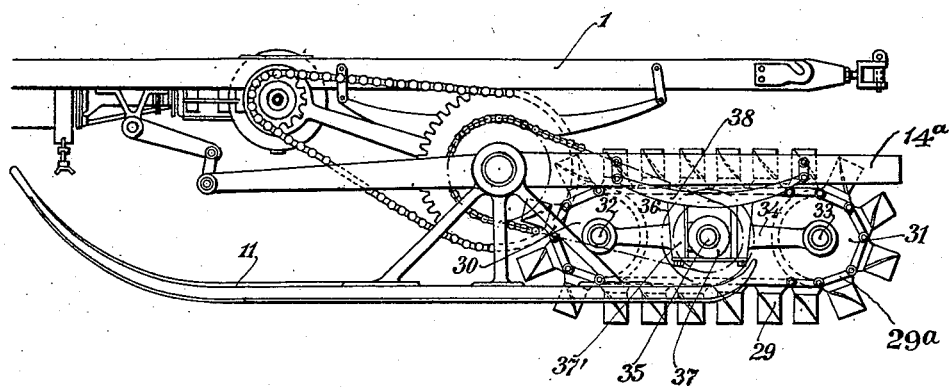
Fig. 3 is an elevation of the rear portion of an automobile provided a sled attachment constructed in accordance with another embodiment of my invention.

The chassis of an automobile is indicated at 1, the rear axle at 2, the front axle at 3, and the front and rear ends of the chassis are respectively indicated at 4, 5. In the form of my invention shown in Figs. 1 and 2, rear runners 10 are provided with hubs 11 and with braces 11ª which connect the hubs to the runners. The rear wheels of the automobile are removed and the hubs 11 are arranged on the ends of the rear axle. Levers 14 are also pivotally mounted on the rear axle, the bearings 14ª of said levers being at points intermediate the ends thereof so that said levers extend forwardly and also rearwardly from the rear axle. Each of said levers is provided at its rear end with a rearwardly extending leaf spring 13. Said springs are provided at their rear ends with bearings 15 for a shaft 16, and the said shaft is provided at its center with a tractor wheel 17, and at its ends with sprocket wheels 17ª. Said sprocket wheels are connected by endless sprocket chains 17ᵇ to sprocket wheels 17ᶜ which are secured on the ends of the rear axle, and hence the tractor wheel 17 can be rotated by the power of the motor of the automobile, as will be understood, in order to propel the same when in use as a sleigh or sled.

Rocking links 18ª are pivotally connected, as at 18ᵇ, to hangers 18ᶜ, which are suitably secured to the chassis and depend therefrom, and said links are also pivotally connected, as at 18ᵈ to the front ends of the runners. A rock shaft 18 is mounted in suitable bearings 18ᵉ which are secured also to the chassis and arranged slightly in rear of the hangers 18ᶜ. Said rock shaft is provided at its ends with cranks 18ᶠ which are connected by links 18ᵍ to the front ends of the levers 14, as shown. Said rock shaft also has a sprocket wheel 20 which is connected by an endless sprocket chain 20ª to a sprocket wheel 20ᵇ, (indicated in dotted lines in Fig. 1) which is fixed on an operating shaft 20ᶜ which is mounted in suitable bearings in the chassis, and is provided with an operating lever 21, and also with a suitable segment and dog to enable said lever to be secured in any desired position, as indicated also in dotted lines in Fig. 1. Inasmuch as the tractor wheel 17 is carried by the rear ends of the levers 14, and inasmuch as the front ends of said levers may be raised or lowered by operating the lever 21, through the connection hereinbefore described, the tractor wheel may be raised or lowered by the chauffeur whenever this may be desired or become necessary in the operation of the car. The link connection 18ª, 18ᵇ, between the front ends of the runners and the chassis enables the runners to turn pivotally on the rear axle to adapt themselves to inequalities in the road surface, and the runners are effectually prevented from overturning.

Front runners 10ª are secured by suitable clamping means 10ᵇ to the lower sides of the front wheels 6, which wheels are not removed. The rear wheels are removed when the rear runners and levers 14 are employed, and the position of the rear wheels is indicated by a dotted circle at 7 in Fig. 1. The embodiment of the invention shown in Figs. 1 and 2 and hereinbefore described is especially for use in connection with ordinary passenger automobiles.

Figure 4:
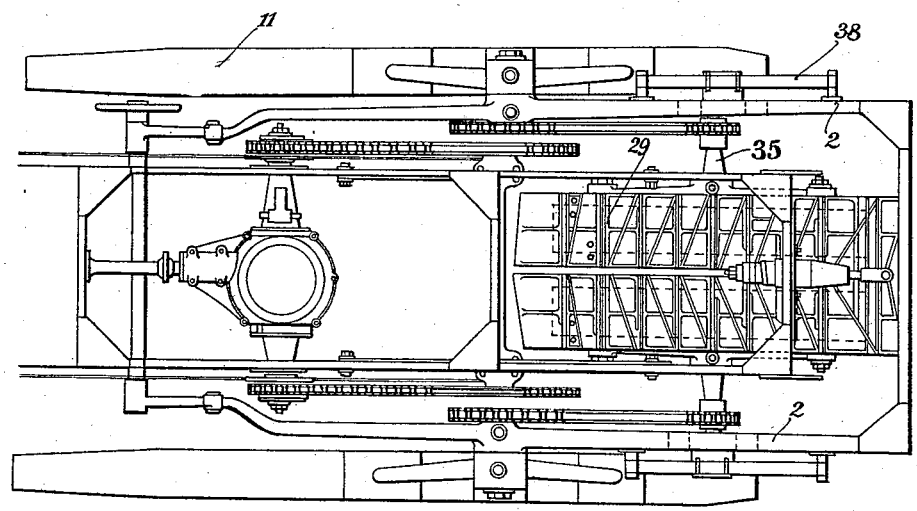
Fig. 4 is a plan of the same.

The embodiment of my invention shown in Figs. 3 and 4 is especially designed for use in connection with automobile trucks. The traction unit comprises a shaft 35 which is mounted in bearings 37 arranged between hangers 37' which depend from the levers 14ª yieldably mounted by springs 38 as shown in Figs. 3 to 5. Levers 34 have their central portions pivotally mounted on the shaft 35 and are provided at their front and rear ends with bearings for shafts 32, 33. Shaft 32 has wheels 30, shaft 35 has wheels 36, and shaft 33 has wheels 31. Said wheels are connected together by endless chains or belts 29ª which are provided with tread elements 29. These chains 29ª are driven by the driving wheel 36, on the axle 35 of which the whole traction chain arrangement is swingingly mounted.

The bearings for each of said shafts and also for the shaft 16, comprise each a casing 23 around the axle pins 22, a spline 24 in the axle pin and a groove in the casing engaged by said spline allowing longitudinal movement of the axle, and further a substantially spherical member 37ª and a socket member 37ᵇ in which said substantially spherical member is mounted for universal angular movement, as shown in detail in Fig. 5.

Similar bearings are also provided for the shaft 16 shown in Figs. 1 and 2 of the drawings, a substantially spherical member being indicated at 26, and the socket member being indicated at 26ª. Within the member 26 is a member 26ᵇ and bearing balls 25 are arranged in races with which said members 26, 26ᵇ are provided.

In the modification shown in Fig. 7, the levers 14ᵇ which carry the runners and the traction units are arranged on the outer side of the chassis or frame 1ª, and in the form of the invention shown in Fig. 8, the levers 14ᶜ are arranged between the sides of the chassis or frame 1ᵇ. In both these forms of the invention the rear wheels are retained in place on the rear axle when the runners or sleigh attachments are used.

Having thus described my invention I claim:—

1. A sleigh attachment for motor vehicles, comprising a pair of levers each pivotally mounted at a point intermediate its ends, a traction unit mounted between said levers near one end thereof, means for raising and lowering the opposite end of the levers and thereby raising or lowering the traction unit, and runners pivotally mounted on the pivotal axis of said levers.

2. A sleigh attachment for motor vehicles comprising a pair of approximately horizontal double-armed levers pivotally mounted on the back axle, a traction unit mounted between said levers near one end thereof, means for raising and lowering the opposite end of the levers and thereby raising or lowering the traction unit and runners mounted on the pivotal axis of said levers.

3. A sleigh attachment for motor vehicles, comprising a pair of approximately horizontal double-armed levers pivotally mounted on the back axle, a traction unit mounted between said levers near one end thereof, means for oscillating the axle of the traction unit in the bearings, means for raising and lowering the opposite end of the levers and thereby raising and lowering the traction unit, and runners mounted on the pivotal axis of said levers.

4. A sleigh attachment for motor vehicles, comprising a pair of approximately horizontal double-armed levers pivotally mounted on the back axle, a traction unit mounted between said levers near one end thereof, springs provided between the traction unit and the levers, means for oscillating the axle of the traction unit in the bearings, means for raising and lowering the opposite end of the levers and thereby raising or lowering the traction unit, and runners mounted on the pivotal axis of said levers.

5. A sleigh attachment for motor vehicles, comprising a pair of approximately horizontal double-armed levers pivotally mounted on the back axle, a traction unit mounted between said levers near one end thereof, casings around the axle pins of the traction unit axle shaft with a spline in the axle pin and a groove in the casing, allowing the longitudinal mobility of the axle shaft, ball-shaped bearing bushes, allowing an oblique position of the traction unit, means for raising and lowering the opposite end of the levers, and runners mounted on the pivotal axis of said levers.

6. A sleigh attachment for motor vehicles, comprising a pair of approximately horizontal double-armed levers pivotally mounted on the back axle, an endless traction chain arrangement unit mounted between said levers near one end thereof, levers on both sides and pivoted on the shaft of the driving chain wheel of the endless traction chain, means for universal angular movement of the endless traction chain arrangement, and means for raising and lowering the opposite end of the levers and thereby raising or lowering the traction chain arrangement.

In testimony whereof I affix my signature in presence of two witnesses.

JAKOB RANTASÁ.

Witnesses:
IGNAZ KNÖRFELMACHER,
KARL TIPPELT.